US011772018B1

(12) United States Patent
Chen et al.

(10) Patent No.: US 11,772,018 B1
(45) Date of Patent: Oct. 3, 2023

(54) AEROSOL PARTICULATE MATTER COLLECTING DEVICE AND COLLECTING METHOD

(71) Applicant: Institute of Urban Safety and Environmental Science, Beijing Academy of Science and Technology, Beijing (CN)

(72) Inventors: Rui Chen, Beijing (CN); Yuqing Chang, Beijing (CN); Shichuan Tang, Beijing (CN)

(73) Assignee: Institute of Urban Safety and Environmental Science, Beijing Academy of Science and Technology

( * ) Notice: Subject to any disclaimer, the term of this patent is extended or adjusted under 35 U.S.C. 154(b) by 0 days.

(21) Appl. No.: 18/091,622

(22) Filed: Dec. 30, 2022

(30) Foreign Application Priority Data

Mar. 16, 2022 (CN) .......................... 202210261955.7

(51) Int. Cl.
*B01D 35/06* (2006.01)
*B01D 45/08* (2006.01)
(Continued)

(52) U.S. Cl.
CPC ............ *B01D 35/06* (2013.01); *B01D 35/02* (2013.01); *B01D 35/26* (2013.01); *B01D 45/08* (2013.01); *B01D 53/323* (2013.01); *B03C 3/145* (2013.01); *B03C 3/15* (2013.01); *B03C 3/88* (2013.01); *B01D 45/04* (2013.01); *B01D 45/12* (2013.01); *B01D 53/24* (2013.01); *B01D 2257/91* (2013.01); *B01D 2259/80* (2013.01); *B03C 3/0175* (2013.01)

(58) Field of Classification Search
CPC ..................................................... B03C 3/145
See application file for complete search history.

(56) References Cited

U.S. PATENT DOCUMENTS 3,765,153 A * 10/1973 Grey ........................ F23J 15/02
96/48

FOREIGN PATENT DOCUMENTS

| KR | 1157822 B1 * | 6/2012 | ............... B03C 3/38 |
| KR | 20140129854 A * | 11/2014 | ............... B03C 3/15 |

OTHER PUBLICATIONS

KR101157822B1—preview (IP.com machine translation of Kim) (Year: 2012).*

(Continued)

*Primary Examiner* — Jonathan Miller
*Assistant Examiner* — Gabriel E Gitman
(74) *Attorney, Agent, or Firm* — Corner Counsel, LLC (57) ABSTRACT

The aerosol particulate matter collecting device includes a shell, a first electric field component, a second electric field component and the collection unit. The first electric field component is connected to the shell and forms a first electric field area, the second electric field component is connected to the shell and forms a second electric field area, the second electric field component includes a first plate and a second plate, and the electric property of the first plate is opposite to that of the first electric charges; a bottom plate of the collection unit is located between the first plate and the second plate, protrusions are arranged on the bottom plate, a flow channel for accommodating collecting liquid is formed in the bottom plate, the protrusions are configured to enable the flow channel to extend along a curve.

19 Claims, 4 Drawing Sheets

(51) Int. Cl.
    *B01D 53/32*     (2006.01)
    *B03C 3/145*     (2006.01)
    *B03C 3/88*     (2006.01)
    *B01D 35/02*     (2006.01)
    *B01D 35/26*     (2006.01)
    *B03C 3/15*     (2006.01)
    *B03C 3/017*     (2006.01)
    *B01D 53/24*     (2006.01)
    *B01D 45/12*     (2006.01)
    *B01D 45/04*     (2006.01)

(56) References Cited

OTHER PUBLICATIONS

KR20140129854A—preview (IP.com machine translation of Kim) (Year: 2014).*

* cited by examiner

| Collecting target gas | 111 |

| Enabling the target gas to pass through a first electric field area to form pretreated aerosol carried with first electric charges so as to form pretreated gas | 112 |

| Enabling the pretreated gas to enter a cyclone separation area so that the aerosol particulate matter separated in the cyclone separation area falls into the collecting liquid | 113 |

| Enabling the pretreated gas to enter the second electric field area, and controlling the electrical property of the lower plate in the second electric field area to be opposite to that of the first electric charges, so that the aerosol in the pretreated gas is attracted by the lower plate and falls into the collecting liquid | 114 |

FIG. 9

AEROSOL PARTICULATE MATTER COLLECTING DEVICE AND COLLECTING METHOD

CROSS-REFERENCE TO RELATED APPLICATION

This patent application claims the benefit and priority of Chinese Patent Application No. 202210261955.7 filed on Mar. 16, 2022, the disclosure of which is incorporated by reference herein in its entirety as part of the present application.

TECHNICAL FIELD

The present disclosure relates to the technical field of gas treatment, in particular to an aerosol particulate matter collecting device, a collection unit for collecting aerosol particulate matter, collecting and detecting equipment and an aerosol particulate matter collecting method.

BACKGROUND

As a kind of widely existing virus in the nature, coronavirus can not only cause common cold for infected people, but also can cause serious respiratory diseases. The coronavirus, including SARS-CoV, MERS-CoV and SARS-CoV-2, can cause severe respiratory diseases. The corona virus disease (COVID19) is caused by SARS-CoV-2, and is an acute respiratory infectious disease, with the main symptoms of the patients such as fever, dry cough and fatigue; the corona virus disease can lead to acute respiratory distress syndrome and multiple organ failure. At present, a fast, convenient and accurate method is urgently needed to collect and detect Covid-19.

Coronavirus has the characteristics of high respiratory tract infection. The virus is mainly released from the individual respiratory tract of the virus carrier, and then spread through droplets and aerosol. That is, droplets and aerosol (smaller particles) usually cause the spread of epidemic diseases. Many cases of super-transmission show that there is an aerosol propagation mode, that is, biological aerosol containing virus can float in the air for a longer time or even be transported over a long distance. For example, in certain indoor specific environments, such as the central air-conditioning environment, public transport means, stations and other places where people gather, and even when sewer aerosol is released into buildings, greater uncertainty of interpersonal propagation can be caused.

Under the background of the normalization of epidemic situation, sporadic cases occur periodically in China. When there are cases in a certain place, under the premise of current technical means, nucleic acid detection of all staff must be taken, so that a lot of manpower, material resources and financial resources are consumed, and cross infection is easy to occur in large-scale gathering. Nucleic acid detection is the main technical means of Covid-19 positive screening at present, but the technical means is time-consuming and requires professional technicians and laboratories. Moreover, there are some limitations for nucleic acid detection, resulting in some missed detection conditions. Therefore, asymptomatic infected persons cannot be detected possibly.

Rapid detection and screening of highly infectious coronavirus is the key to epidemic prevention. Due to the characteristic of coronavirus aerosol propagation, how to develop responsive detection technology and products is the key research direction in the future.

SUMMARY

The present disclosure provides an aerosol particulate matter collecting device, for solving the problem of low aerosol particulate matter collection efficiency in the prior art, and collecting aerosol particulate matter in the environment with high efficiency.

The aerosol particulate matter collecting device includes:
a shell, provided with an air inlet and an air outlet;
a first electric field component, connected to the shell and forming a first electric field area, and configured for enabling aerosol passing through the first electric field area to be carried with first electric charges;
a second electric field component, connected to the shell and forming a second electric field area, wherein the second electric field area is located downstream of the first electric field area, the second electric field component includes a first plate and a second plate located on the first plate, and a potential difference is formed between the first plate and the second plate, and electric property of the first plate is opposite to that of the first electric charges; and
a collection unit, arranged inside the shell, wherein a bottom plate of the collection unit is located between the first plate and the second plate, and provided with protrusions, a flow channel for accommodating collecting liquid is formed in the bottom plate, and the protrusions are configured to enable the flow channel to extend along a curve.

According to the aerosol particulate matter collecting device, the shell is provided with a first channel section, a second channel section and a connecting section for connecting the first channel section and the second channel section, an angle is formed between the first channel section and the second channel section, the connecting section and the second channel section are provided with the collection unit, the connecting section is selectively provided with the second electric field component, and the second channel section is provided with the second electric field component.

According to the aerosol particulate matter collecting device, the connecting section extends along a straight line or a curve; and
a slope gradient of the connecting section extending along the straight line is greater than or equal to 0.2 and less than or equal to 0.8, and a curvature ratio of the connecting section extending in the curve is greater than or equal to 2.5 and less than or equal to 6.5.

According to the aerosol particulate matter collecting device, each protrusion includes a first part and a second part located on the first part, a first surface of the first part extends along a vertical direction, the second part is provided with a second surface connected to the first surface, and the second surface is inclined towards the air outlet relative to the first surface.

According to the aerosol particulate matter collecting device, a longitudinal section of the second part along a wind flow direction is at least one of a triangle, a semicircle and an ellipse.

According to the aerosol particulate matter collecting device, a liquid surface of the collecting liquid in the collection unit is set to be not higher than a connection position where the first part and the second part are connected; and a height of the first part is greater than or equal to half of a height of the protrusion.

According to the aerosol particulate matter collecting device, the flow channel is an S-shaped flow channel, a spiral flow channel or a flow channel formed by communicating a plurality of U-shaped flow channels;

and/or, a width of the flow channel is greater than or equal to the width of the protrusion;

and/or, the bottom plate is provided with 30-60 protrusions per meter.

According to the aerosol particulate matter collecting device, the collection unit is detachably provided in the shell and provided with a liquid inlet and a liquid outlet which are communicated with the flow channel, and the liquid inlet and the liquid outlet are communicated through a pipeline, and the pipeline is provided with a pump.

According to the aerosol particulate matter collecting device, the first plate is parallel to the second plate, the first plate is grounded, and the second plate is loaded with a voltage greater than or equal to 1 kV and less than or equal to 60 kV;

and/or, the first electric field component includes a corona needle and a third plate surrounding circumference of the corona needle, and the first electric field component is loaded a voltage greater than or equal to 1 kV and less than or equal to 30 kV.

According to the aerosol particulate matter collecting device, a filter is arranged at the air inlet;

and/or, a baffle is arranged at the air outlet, and a baffle area of the baffle is adjustable.

The present disclosure provides a collection unit for collecting aerosol particulate matter, including:

a bottom plate, provided with protrusions; and a flow channel formed in the bottom plate, for collecting liquid to flow through, and the protrusions are configured to enable the flow channel to extend along a curve.

According to the collection unit for collecting aerosol particulate matter, each protrusion includes a first part and a second part located on the first part, a first surface of the first part extends along a vertical direction, the second part is provided with a second surface connected to the first surface, and the second surface is inclined towards the air outlet relative to the first surface.

According to the collection unit for collecting aerosol particulate matter, a longitudinal section of the second part along a wind flow direction is at least one of a triangle, a semicircle and an ellipse.

According to the collection unit for collecting aerosol particulate matter, a liquid surface of the collecting liquid in the collection unit is set to be not higher than a connection position where the first part and the second part are connected; and a height of the first part is greater than or equal to half of a height of the protrusion.

According to the collection unit for collecting aerosol particulate matter, the flow channel is an S-shaped flow channel, a spiral flow channel or a flow channel formed by communicating a plurality of U-shaped flow channels; and and/or, a width of the flow channel is greater than or equal to the width of the protrusion.

The present disclosure further provides an aerosol particulate matter collecting device, including:

a shell, provided with an air inlet and an air outlet;

a second electric field component, connected to the shell and forming a second electric field area, wherein the second electric field component includes a first plate and a second plate located on the first plate, and a potential difference is formed between the first plate and the second plate; and a collection unit, arranged inside the shell, wherein a bottom plate of the collection unit is located between the first plate and the second plate, protrusions are provided on the bottom plate, a flow channel for accommodating collecting liquid is formed in the bottom plate, and the protrusions are configured to enable the flow channel to extend along a curve.

The present disclosure further provides collecting and detecting equipment, including a particulate matter detecting device and the aerosol particulate matter collecting device described above, where the particulate matter detecting device is communicated with the collection unit so as to guide the collecting liquid into the aerosol particulate matter detecting device.

The present disclosure further provides an aerosol particulate matter collecting method, including following steps:

collecting target aerosol;

enabling the target aerosol to pass through a first electric field area to form pretreated aerosol carried with first electric charges so as to form pretreated aerosol;

enabling the pretreated aerosol to enter a cyclone separation area so that aerosol particulate matter separated in the cyclone separation area falls into the collecting liquid; and enabling the pretreated aerosol to enter the second electric field area, and controlling electric property of a lower plate in the second electric field area to be opposite to that of the first electric charges, so that the particulate matter in the pretreated aerosol is attracted by the lower plate and falls into the collecting liquid.

According to the aerosol particulate matter collecting method, at least part of the cyclone separation area is overlapped with the second electric field area.

According to the aerosol particulate matter collecting method, providing a collection unit at a bottom of the cyclone separation area and the second electric field area, where the collection unit is provided with protrusions and a flow channel limited by the protrusions, the flow channel is configured for accommodating the collecting liquid.

According to the aerosol particulate matter collecting device provided by the present disclosure, the target aerosol is collected through the shell. The first electric field component, the second electric field component and the collection unit are arranged in the shell. The particulate matter in the target aerosol is carried with the first electric charges when the target aerosol passes through the first electric field component, the aerosol carried with the first electric charges flows downstream, and the aerosol flows into a connection position. At the connection position, due to the double effects of cyclone, and the protrusions and the flow channel on the surface of the collection unit, the particulate matter with smaller average particle size in the aerosol falls into the collecting liquid of the flow channel, and the aerosol flows into the second electric field area corresponding to the second electric field component. In the second electric field area, the aerosol particulate matter falls into the collecting liquid accommodated in the collection unit through the double effects of electrostatic adsorption and gravity deposition so as to facilitate subsequent detection. In the second electric field area, the electric property of the lower first plate in the second electric field component is opposite to that of the first electric charges, and the particulate matter in the target aerosol can be separated by adsorption. When the aerosol particulate matter collecting device is applied to aerosol collection in ambient air, nucleic acid detection can be carried out on the collected collecting liquid to detect whether there is a target virus in the environment, thereby realizing rapid, comprehensive and accurate collection of the target virus in the environment.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show some embodiments of the present disclosure, and a person of ordinary skill in the art may still derive other accompanying drawings from these accompanying drawings without creative efforts.

REFERENCE NUMERALS

100, shell; 110, air inlet; 120, air outlet; 130, baffle; 140, first channel section; 150, second channel section; 160, connecting section; 170, filter;
200, first electric field component; 210, corona needle; 220, third plate;
300, second electric field component; 310, first plate; 320, second plate;
400, collection unit; 410, bottom plate; 411, guide surface; 420, connecting part; 430, protrusion; 431, first part; 4311, first surface; 432, second part; 4321, second surface; 440, flow channel; 450, liquid inlet; 460, liquid outlet; 470, pipeline; 480, pump;
500, draught fan; and 600, collecting liquid.

DETAILED DESCRIPTION OF THE EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. Based on the embodiment in the present disclosure, all other embodiments obtained by the ordinary technical staff in the art under the premise of without contributing creative efforts belong to the scope protected by the present disclosure.

Moreover, in the description of the present disclosure, except as otherwise noted, the meaning of "a plurality of" indicates two or more than two.

According to the embodiment in the first aspect of the present disclosure, referring to FIG. 1 to FIG. 8, an aerosol particulate matter collecting device is provided, including a shell 100, a first electric field component 200, a second electric field component 300 and a collection unit 400. The shell 100 is provided with an air inlet 110 and an air outlet 120. Target aerosol enters the shell 100 through the air inlet 110. The particulate matter in the target aerosol is separated in the shell 100, and the treated aerosol is discharged from the air outlet 120.

Figure 1:
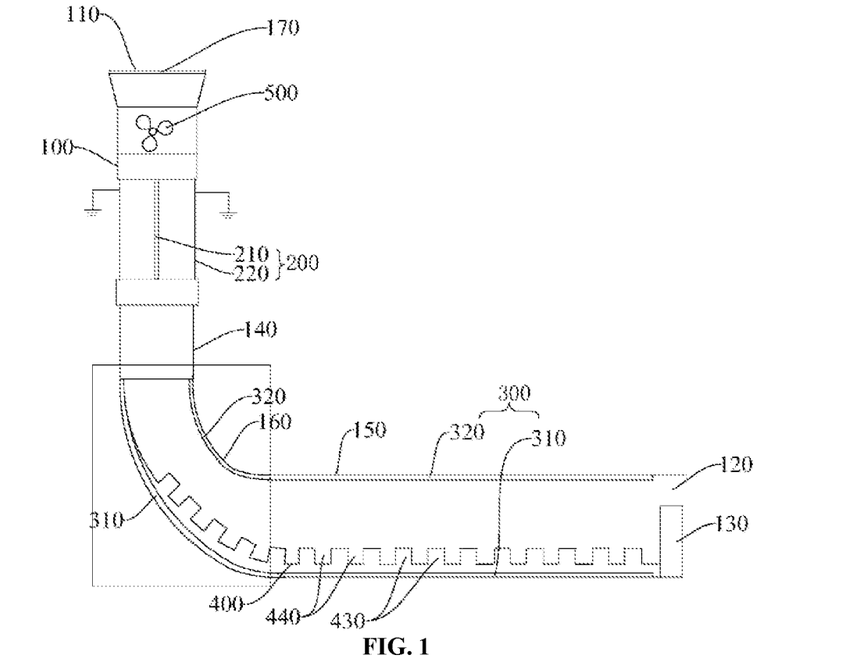
FIG. 1 is a schematic structural diagram of an aerosol particulate matter collecting device provided by the present disclosure.

The target aerosol enters the shell 100, the particulate matter in the target aerosol is separated in the shell 100 through cooperation of electrostatic adsorption and surface deposition, and falls into the collecting liquid 600.

The first electric field component 200 is connected to the shell 100 and forms a first electric field area. The first electric field component 200 is used for enabling the aerosol passing through the first electric field area to be carried with first electric charges, and the first electric field area can also be understood as a pre-charged area.

The second electric field component 300 is connected to the shell 100 and forms a second electric field area, and the second electric field area is located downstream of the first electric field area. In the second electric field area, the aerosol carried with the first electric charges can be attracted by the opposite electric charges below and falls down, so that the aerosol falls into the lower collection unit 400.

The second electric field component 300 includes a first plate 310 and a second plate 320 located above the first plate 310. A potential difference is formed between the first plate 310 and the second plate 320. The electrical property of the first plate 310 is opposite to that of the first electric charges, so that the first plate 310 attracts the aerosol carried with the first electric charges to fall downwards.

The collection unit 400 is arranged inside the shell 100. A bottom plate 410 of the collection unit 400 is located between the first plate 310 and the second plate 320. The bottom plate 410 of the collection unit 400 can be used for accommodating the collecting liquid 600, so that the aerosol falling towards the direction of the first plate 310 falls into the collecting liquid 600.

Protrusions 430 are arranged on the bottom plate 410. A flow channel 440 used for accommodating the collecting liquid 600 is formed in the bottom plate 410. The protrusions are configured to enable the flow channel 440 to extend along a curve, so that the collecting liquid 600 is distributed on the bottom plate 410 in a curve shape, and the aerosol is deposited in the collecting liquid 600. The protrusions 430 are arranged on the bottom plate 410, which can be understood that the bottom plate 410 is provided with ribs and the flow channel (the surface of the bottom plate is rough, not flat), and the collecting liquid flows in the chamber, thereby enhancing the aerosol collecting efficiency.

In some cases, the collecting liquid 600 can circularly flow in the flow channel 440 without limiting the collecting liquid 600 to be smoothly distributed in the flow channel 440.

It should be noted that the collection unit 400 is made of insulating materials, so that the collection unit 400 is prevented from interfering with the electric field generated by the second electric field component 300, and it is ensured that the particulate matter can be separated from the target aerosol and fall into the collecting liquid 600.

Thus, the aerosol particulate matter collecting device in the embodiment of the present disclosure can be used for collecting the particulate matter in the target aerosol, and the collected particulate matter can be detected to analyze the target aerosol. For example, the particle size spectrum and components of the target aerosol particulate matter, and inorganic and organic components (nucleic acids and/or proteins and/or proteins, and/or organic and inorganic small molecules) in the particulate matter are analyzed for detection. When the target aerosol is air, the aerosol collected by the aerosol particulate matter collecting device can be used for analyzing whether coronavirus is carried. For example, the aerosol sample collection and nucleic acid detection for COV-19 can be applied to the aerosol collection in Covid-19, and the aerosol carried with virus can be collected more efficiently.

The particle size of the aerosol particulate matter is one hundred nanometers to several hundred nanometers, but the aerosol particulate matter may be attached to other larger aerosols, electrostatic adsorption and rough surface retention are applied to one aerosol particulate matter collecting device to collect the aerosols with multiple particle size ranges, so that the sensitivity of the collection unit is improved, and the problem that the sensitivity of the aerosol particulate matter is insufficient is solved.

The aerosol particulate matter collecting device in the embodiment of the present disclosure is used for collecting the aerosols in the ambient air, and coronavirus collection in the ambient air and subsequent monitoring and early warning are carried out, so that the problem of missed detection caused by certain limitations of a nucleic acid detection crowd is solved. In cooperation with human coronavirus detection, the location of coronavirus spreading in the environment and the location monitoring of a positive crowd can be controlled within a short time after the occurrence of positive cases to avoid nucleic acid detection by all staff. Therefore, the cost is reduced, the epidemic situation is controlled more quickly, and the influence of coronavirus on the social order is minimized.

It needs to be noted that in the embodiment of the present disclosure, the aerosol particulate matter firstly enters the first electric field area, so that the aerosol particulate matter enters the second electric field area after being charged. Such a structural form helps to increase the gas flow flux of the aerosol particulate matter collecting device under the condition of ensuring the treatment efficiency, so that the particulate matter separation efficiency of the equipment is higher. Certainly, in some cases, if the aerosol particulate matter is carried with electric charges itself, the first electric field component is not required, and the aerosol particulate matter directly enter the second electric field area. The electric property of the first plate can be set according to the charged property of the aerosol particulate matter, the first plate cooperates with the collection unit to separate the aerosol particulate matter. That is, when the aerosol particulate matter collecting device is not provided with the first electric field component, other structures of the second electric field component, the collection unit and the shell can be all the structures in the following embodiments.

The structure of the shell 100 is described as follows.

In some embodiments, referring to FIG. 1, the shell 100 is provided with a first channel section 140, a second channel section 150 and a connecting section 160 provided between the first channel section 140 and the second channel section 150. The target aerosol sequentially flows through the first channel section 140, the connecting section 160 and the second channel section 150. An angle is formed between the first channel section 140 and the second channel section 150, so that the target aerosol forms a cyclone inside the collecting section 160, and the particulate matter in the target aerosol is separated under the effect of the cyclone.

The angle formed by the first channel section 140 and the second channel section 150 can be controlled in the range of 60° to 120°, so that the target aerosol can form the cyclone in the connecting section 160. For example, a right angle is formed between the first channel section 140 and the second channel section 150. In some cases, the collection unit 400 is provided in the connecting section 160 and the second channel section 150, the connecting section 160 is selectively provided with the second electric field component 300, and the second channel section 150 is provided with the second electric field component 300.

When the connecting section 160 is provided with the collection unit 400, in the connecting section 160, the particulate matter in the target aerosol can be separated through the effect of cyclone separation, and the flow channel 440 of the collection unit 400 and the protrusions on the surface of the collection unit 400 enhance the separation effect. The flow channel 440 of the collection unit 400 cooperates with the protrusions, which means that the collection unit 400 is provided with a rough surface.

For the target aerosol entering the connecting section 160, under the cooperation of the cyclone generated by the corner of the connecting section 160, the protrusions on the surface and the flow channel formed by the protrusions, the particulate matter with smaller particle size in the target aerosol is separated and falls into the collecting liquid.

When the connecting section 160 is provided with the second electric field component 300 and the collection unit 400, in the connecting section 160, the particulate matter in the target aerosol can be separated through three effects of cyclone separation, and rough surface and electrostatic adsorption for the flow channel 440 of the collection unit 400, so that the separation effect is better, and the sensitivity of the collection unit can be improved.

It needs to be noted that, referring to FIG. 1, the area corresponding to the dotted frame part in FIG. 1 can be understood as the difference corresponding to the connecting section 160. Whether to arrange the second electric field component 300 in the area corresponding to the connecting section 160 can be selected according to the needs. If the test shows that the aerosol collection efficiency is higher when the second electric field component 300 is provided in the area corresponding to the connecting section 160, the second electric field component 300 is provided. If the test shows that the aerosol collection efficiency is higher without the second electric field component 300, the second electric field component 300 is not provided.

The second channel section 150 is provided with the second electric field component 300 and the collection unit 400. In the connecting section 160, a part of aerosol is separated, and in the second channel section 150, the aerosol is separated by electrostatic adsorption.

When both the connecting section 160 and the second channel section 150 are provided with the second electric field component 300 and the collection unit 400, in the connecting section 160, the particulate matter in the target aerosol can be separated by the double actions of cyclone separation and electrostatic adsorption, and in the second channel section 150, the particulate matter in the target aerosol can be separated by electrostatic adsorption, which has better separation effect and improves the sensitivity of the collection unit.

In some cases, a part of aerosol is collected in the connecting section 160, and the aerosol is further collected in the second channel section 150 to improve the aerosol collection efficiency. The aerosol collected by the connecting section 160 (aerodynamic equivalent diameter of aerosol) is smaller than that collected by the second channel section 150. For example, the aerodynamic equivalent diameter of the aerosol collected by the connecting section 160 is less than 2.5 µm, and the aerodynamic equivalent diameter of the aerosol collected by the second channel section 150 is less than 50 µm. The electric field conditions provided by the first electric field component and the second electric field component, the angle range formed between the first channel section and the second channel section and the structure of the connecting section can be adjusted according to the needs, so that the collection efficiency of the aerosol particulate matter in different collection areas can be optimized to achieve the highest collection efficiency.

In some cases, the connecting section 160 can be made of acrylic material, but it is not limited to acrylic material. When the connecting section 160 is provided with the second electric field component 300, the inner side of the acrylic material is provided with a stainless steel plate, the lower first plate 310 is grounded, and the upper second plate 320 is a stainless steel negative plate. Similarly, the second channel section 150 can be made of acrylic material, but it is not limited to acrylic material. When the second channel section 150 is provided with the second electric field component 300, the inner side of the acrylic material is provided with a stainless steel plate, the lower first plate 310 is grounded, and the upper second plate 320 is a stainless steel negative plate.

It needs be noted that the first electric field component 200 is arranged upstream of the first channel section 140, or the first electric field component 200 is arranged in the first channel section 140, which can be selected as required.

In some embodiments, the connecting section 160 extends along a straight line (not shown in the figures), that is, the connecting section 160 has a slope gradient, and the connecting section 160 is simple in structure and convenient to process.

The slope gradient of the connecting section 160 is a ratio of the height of the connecting section to the length of the connecting section. The slope gradient of the connecting section 160 is not shown in the figures. Referring to the slope gradient of the collection unit in FIG. 4, the collection unit has a height of c corresponding to the connecting section, a length of d corresponding to the connecting section 160, and a slope gradient of c/d corresponding to the collecting section 160, and the slope gradient of the collection unit can be used to represent the slope gradient of the connecting section 160.

In some embodiments, the slope gradient of the connecting section 160 is greater than or equal to 0.2 and less than or equal to 0.8, and the cyclone separation effect is better.

In some cases, the slope gradient of the connecting section 160 is set to be 0.5, and the cyclone separation effect is good.

In some embodiments, the connecting section 160 extends along an arc, and the fluidity of the target aerosol in the shell 100 is better. The curvature ratio of the connecting section 160 can be adjusted as required.

Figure 2:
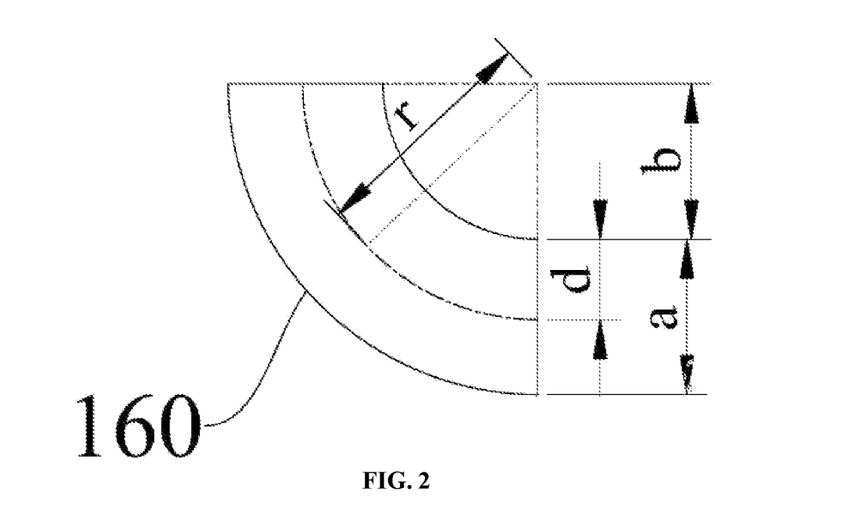
FIG. 2 is a schematic structural diagram of a connecting section of the aerosol particulate matter collecting device provided by the present disclosure.

Referring to FIG. 2, the connecting section 160 can extend along an arc. The target aerosol can be guided into the connecting section 160 tangentially and into the second channel section 150 tangentially, so that the cyclone separation effect of the particulate matter in the target aerosol is better.

The curvature ratio of the connecting section 160 extending along the arc is greater than or equal to 2.5 and less than or equal to 6.5. As shown in FIG. 2, the curvature ratio is the ratio of the radius r corresponding to the center line of the flow channel shown in the figure to the radius d of the flow channel When the connecting section 160 extends along a straight line, the diameter-to-height ratio is greater than or equal to 0.2 and less than or equal to 0.8. Referring to FIG. 2, the connecting section 160 has a diameter of b and a height of a+b, and a ratio of the diameter to the height of the connecting section 160 is 0.5.

In some cases, due to the action of atmospheric pressure, the connecting section 160 is arc-shaped, resulting in uneven distribution of liquid surface in the connecting section 160. The aerosol collection effect of the connecting section 160 extending along the straight line is better.

It needs to be noted that the collection unit 400 is arranged in the connecting section 160 and the second channel section 150, and the shape of the collection unit 400 is the same as that of the connecting section 160 and the second channel section 150. Furthermore, the collection unit 400 can be of a soft structure, and the collection unit 400 is mounted in the shell 100 to form a structure which is the same as that of the connecting section 160 and the second channel section 150. Alternatively, the collection unit 400 is set to be of a rigid structure with the same shape as the connecting section 160 and the second channel section 150. The depth, width and length of the flow channel 440 of the collection unit 400 can be adjusted according to the needs, so that the collection unit 400 is suitable for aerosol collection in different occasions. In some embodiments, a filter 170 is arranged at the air inlet 110 of the shell 100, and the filter 170 functions to filter impurities with a large volume.

The filter 170 can be of a filter membrane, a filter screen and other structures.

In some embodiments, a baffle 130 is arranged at the air outlet 120 of the shell 100, and the baffle area of the baffle 130 is adjustable. The baffle 130 can be used for adjusting the exhaust area of the air outlet 120, and the size of the air outlet 120 can be adjusted according to the needs, so as to ensure the liquidity of the target aerosol in the shell 100, thereby optimizing the aerosol separation effect.

The baffle area of the baffle 130 can be adjusted through rotation, and the baffle area of the baffle 130 can also be adjusted through extending and retracting, which can be adjusted according to the needs.

In some cases, the aerosol particulate matter collecting device further includes a draught fan 500, and the draught fan 500 functions to promote flow of wind. The draught fan 500 can be arranged in the shell 100, and can also be arranged in front of the air inlet 110 or behind the air outlet 120 of the shell 100, which can be selected according to the needs.

Referring to FIG. 1, the draught fan 500 is arranged upstream of the first electric field component 200, and the draught fan 500 is used for sucking the target aerosol into the shell 100.

The collection unit 400 is described as follows.

According to the embodiment in the second aspect of the present disclosure, a collection unit 400 for collecting aerosol particulate matter is provided. Referring to the above-mentioned contents, the collection unit 400 includes a bottom plate 410, and the bottom plate 410 is provided with protrusions 430. A flow channel 440 for collecting liquid 600 to flow through is formed in the bottom plate 410, and the protrusions 430 are configured to enable the flow channel 440 to extend along a curve path.

In some embodiments, the collection unit 400 is detachably connected to the shell 100, and the collection unit 400 can be detachably replaced.

It needs to be noted that the collection unit 400 can be set as a disposable structure. Once the collection is completed, one collection unit 400 can be replaced to avoid the interference of the collected aerosol by residues. Certainly, the collection unit 400 is not limited to a disposable structure, but can be cleaned after disassembly to ensure the collection accuracy.

Figure 3:
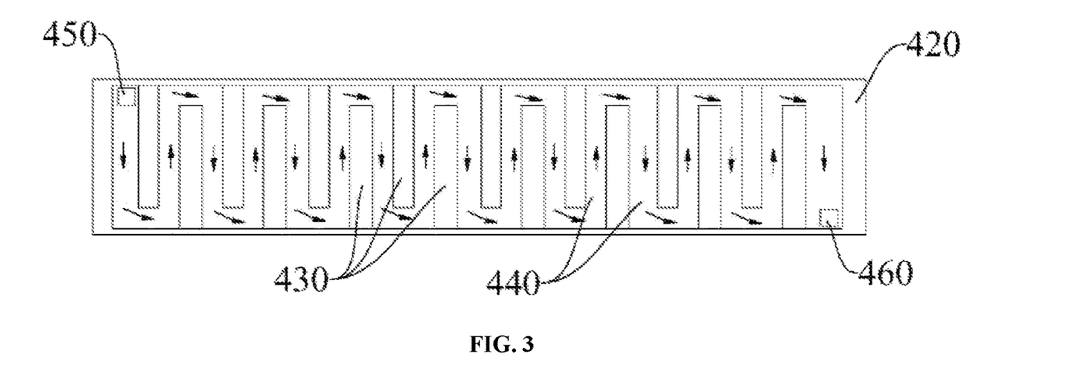
FIG. 3 is a schematic structural diagram in top view of a collection unit for collecting aerosol particulate matter provided by the present disclosure.
Figure 7:
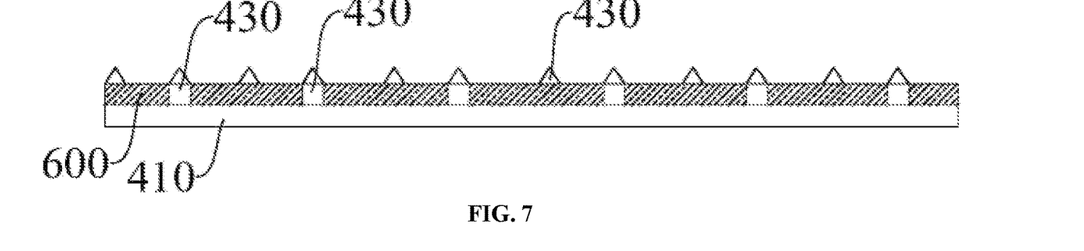
FIG. 7 is a schematic structural diagram in side view of another collection unit for collecting aerosol particulate matter provided by the present disclosure.

Referring to FIG. 1, FIG. 3 and FIG. 7, the collection unit 400 is provided with a liquid inlet 450 and a liquid outlet 460 which are communicated with the flow channel 440, and the liquid inlet 450 and the liquid outlet 460 are communicated with each other through a pipeline 470, and the pipeline 470 is provided with the pump 480. The collection unit 400 can provide a circulation space for the collecting liquid 600, and the collecting liquid 600 can circularly flow in the liquid inlet 450, the flow channel 440, the liquid outlet 460 and the pipeline 470. In the circular flowing process of the collecting liquid 600, the pump 480 can provide driving force to improve the aerosol collection effect.

The pump 480 can be a peristaltic pump.

Figure 4:
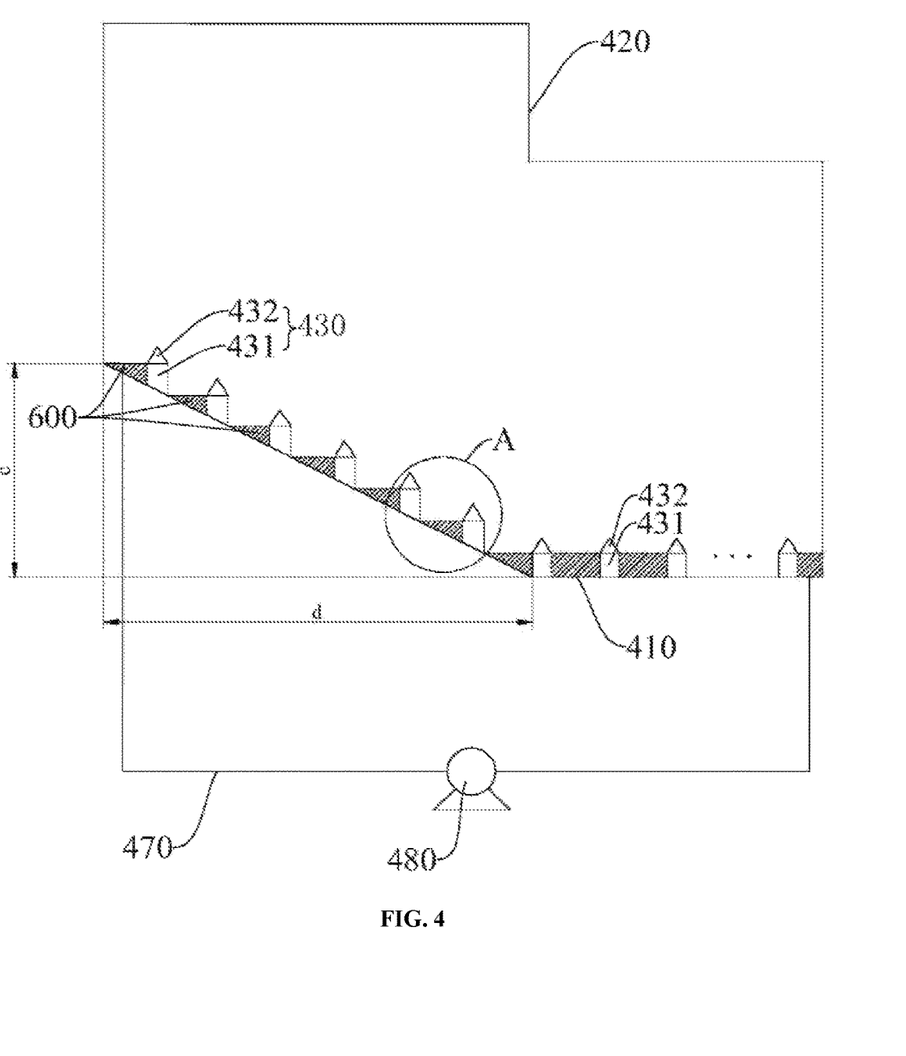
FIG. 4 is a schematic structural diagram in side view of another collection unit for collecting aerosol particulate matter provided by the present disclosure.
Figure 5:
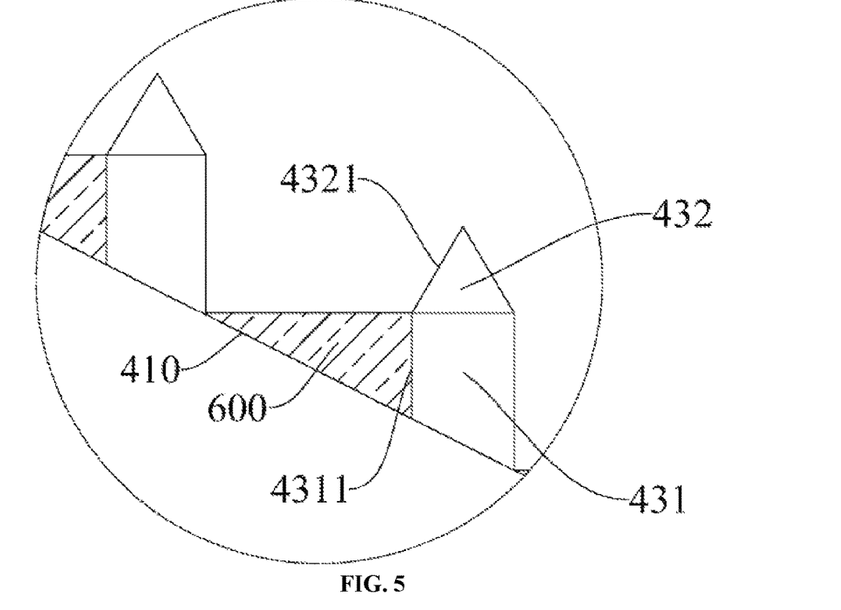
FIG. 5 is a schematic structural diagram in cross section of a portion A in FIG. 4.
Figure 6:
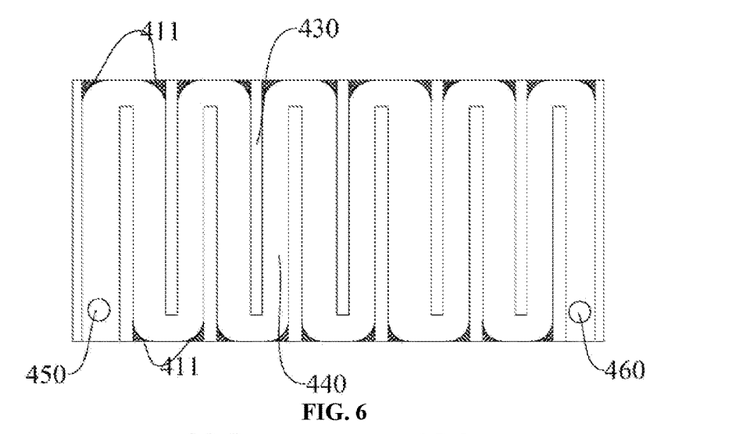
FIG. 6 is a schematic structural diagram in top view of another collection unit for collecting aerosol particulate matter provided by the present disclosure.

In some embodiments, referring to FIG. 4 and FIG. 5, the protrusion 430 include a first part 431 and a second part 432 located on the first part 431, a first surface 4311 of the first part 431 extends along a vertical direction, the second part 432 is provided with a second surface 4321 connected to the first surface 4311, and the second surface 4321 is inclined towards the air outlet 120 relative to the first surface 4311. The area corresponding to the first surface 4311 can be used for accommodating the collecting liquid 600, the area corresponding to the second surface 4321 can make the target aerosol form a cyclone, and the second surface 4321 can also guide the flow of the target aerosol to ensure liquidity of the aerosol.

In some embodiments, a shape of a longitudinal section of the second part 432 along the wind flow direction is at least one of a triangle, a semicircle and an ellipse, which can optimize the collection effect of the aerosol.

When a shape of the protrusion 430 is triangular, the collection efficiency of the aerosol reaches the maximum value.

The wind flow direction is an axis direction of the shell 100. In some cases, the shapes of the protrusions 430 in the collection unit 400 may be, but not limited to, the same. If the shapes of the protrusions 430 are the same, the uniform flow effect in each area of the flow channel 440 can be ensured. If the shapes of the protrusions 430 are different, various collection units 400 can be formed, and the shapes of the protrusions 430 can be adjusted based on requirements of aerosol fluidity in different areas.

Referring to FIG. 4, a longitudinal cross-section of the first part 431 along the wind flow direction is irregularly quadrilateral at the connecting section 160 and rectangular at the second channel section 150, and a shape of the first part 431 can be adjusted according to different positions. The ellipsis in FIG. 4 indicates that a part of the protrusions 430 are omitted.

In some embodiments, referring to FIG. 4 and FIG. 5, the liquid surface of the collecting liquid 600 in the collection unit 400 is set not higher than a connection position where the first part 431 and the second part 432 are connected, so as to ensure the collection accuracy of the aerosol.

In some cases, the liquid surface of the collecting liquid 600 is flush with the connection position where the first part 431 and the second part 432 are connected, so as to improve the collection accuracy of the aerosol.

In some embodiments, a height of the first part 431 is greater than or equal to half of a height of the protrusion 430, so as to ensure the height and the flow of the collecting liquid 600 and then the collection effect of the aerosol.

In some embodiments, the flow channel 440 is an S-shaped flow channel, a spiral flow channel or a flow channel formed by a plurality of communicated U-shaped flow channels. The flow channel 440 is in various structural forms and can be selected as desired.

In some embodiments, the bottom plate 410 is provided with 30 to 60 protrusions 430 per meter, so that the separation effect of the particulate matter in the aerosol can be ensured.

In some embodiments, referring to FIG. 3 to FIG. 7, the bottom plate 410 is provided with a guide surface 411. The guide surface 411 is arranged at the corner of the flow channel 440, so that the flow channel 440 is divided into a plurality of communicated U-shaped flow channels. The guide surface is simple in structure and functions to guide the collecting liquid 600 so as to avoid the flow blind angle.

In some embodiments, a width of the flow channel 440 is greater than or equal to a width of the protrusion 430, so as to ensure a volume of the flow channel and structural stability of the protrusion 430.

In some embodiments, the height of the first part 431 of the protrusion 430 is less than or equal to the width of the flow channel 440, that is, a height of the collecting liquid 600 in the flow channel 440 is less than or equal to the width of the flow channel 440, so as to ensure the aerosol collection effect by the collecting liquid 600.

In some cases, the height of the first part 431 of the protrusion 430 is half of the width of the flow channel 440, and the collecting liquid 600 has a better aerosol collection effect.

The collection unit 400 in the above-mentioned embodiment can be a plate-like structure located in the shell 100. The bottom plate 410 and the connecting part 420 arranged on the periphery of the bottom plate 410 form the flow channel 440, and the flow channel 440 is simple in structure and can be used for collecting the aerosol. The collection unit 400 can also be in a cylindrical structure. The bottom plate 410 is covered with the connecting part 420 to form the cylindrical structure. The flow channel 440 is formed in the cylindrical structure, and the cylindrical structure is arranged on the inner side of the shell 100, which can reduce pollution of the target aerosol on the shell 100. The next aerosol collection can be carried out by replacing the collection unit 400.

The second electric field component 300 is described as follows.

In some embodiments, referring to FIG. 1, the first plate 310 is parallel to the second plate 320, and the potential difference in the second electric field area is uniform, and a uniform electric field is distributed over the second electric field area.

When the shell 100 includes the connecting section 160 and the second channel section 150, the connecting section 160 extends along a straight line, and the first plate 310 and the second plate 320 are both plane plates and parallel to each other. When the connecting section 160 extends along an arc line, the first plate 310 and the second plate 320 arranged on the connecting section are both arc plates and parallel to each other.

The first plate 310 is grounded, and the second plate 320 is loaded with a voltage greater than or equal to 1 kV and less than or equal to 60 kV to ensure the aerosol collection effect. The second plate 320 can be connected to a high-voltage direct-current power supply.

Certainly, the first plate 310 and the second plate 320 can be both loaded with a voltage, to ensure generate a potential difference between the first plate 310 and the second plate 320, and ensure the electric property of the first plate 310 to be opposite to that of the first electric charges.

The first electric field component 200 is described as follows.

Figure 8:
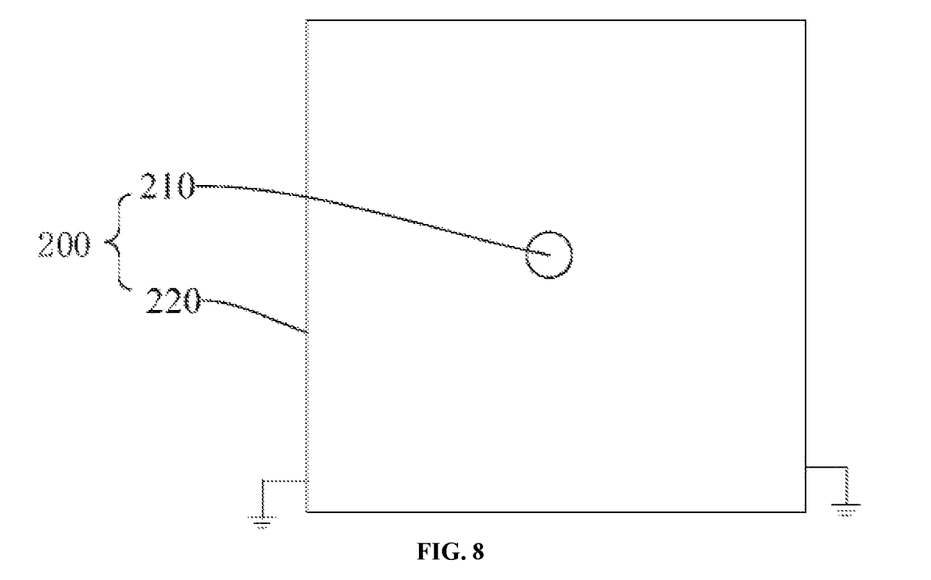
FIG. 8 is a schematic structural diagram in top view of a first electric field component of the aerosol particulate matter collecting device provided by the present disclosure.

In some embodiments, referring to FIG. 1 and FIG. 8, the first electric field component 200 includes a corona needle 210 and a third plate 220 surrounding circumference of the corona needle 210, and the first electric field component 200 is loaded with a voltage greater than or equal to 1 kV and less than or equal to 30 kV.

The corona needle 210 is located in a center of the shell 100, and the corona needle 210 can be negatively charged or positively charged (the electric property of the first electric charges is the same as that of the corona needle 210). The third plate 220 is a stainless steel plate, and an outer side of the third plate 220 is surrounded by an acrylic shell. A cross section of the shell can be round or rectangular, which can be selected according to the needs. In some cases, the corona needle 210 is negatively charged, and the third plate 220 is a grounding electrode.

It needs to be noted that when the corona needle 210 is negatively charged and the third plate 220 is a grounding electrode, the first plate 310 is a positive plate, the aerosol has a good charging effect, and more ozone is generated by the electric field. When the corona needle 210 is positively charged and the third plate 220 is a negative plate, the first plate 310 is a negative plate, and few ozone is generated by the electric field. The corona needle 210 can be connected to a high-voltage direct-current power supply.

After the particulate matter in the target aerosol stay in the first electric field for a certain time, the particulate matter is carried with positive or negative electric charges (that is, the first electric charges are positive or negative).

In the using process of the aerosol particulate matter collecting device in the above-mentioned embodiments, the aerosol enters the first electric field area through the air inlet 110 under the action of the draught fan 500. After staying for a certain time, the aerosol particulate matter is negatively charged and enters the first channel section 140, the connecting section 160 and the second channel section 150. In the connecting section 160, the aerosol particulate matter is deposited in the collecting liquid 600 of the connecting section 160 under the combined action of cyclone force and electric field force (positive charge adsorption), then enters the second channel section 150, and is deposited in the collecting liquid 600 by the electric field force (positive charge adsorption) in the second channel section 150. Under the combined action of inertia and electric field force, the aerosol particulate matter with smaller particle size is separated by cyclone and deposited in the collection unit 400 corresponding to the connecting section 160, and the aerosol particulate matter with larger particle size is deposited on the collection unit 400 corresponding to the second channel section 150 by electrostatic adsorption. In the process, the collecting liquid 600 in the collection unit 400 circularly flows in the flow channel 440 and the pipeline 470 under the action of the pump 480. When the aerosol particulate matter collecting device is used, the air inlet 110 is placed in the downwind breathing area of an area to be detected, and the aerosol particulate matter collecting device is turned on. After the period of 30-60 minutes for collection, the collecting liquid 600 in the collection unit 400 is sent to an auxiliary control system. The auxiliary control system sends the collected collecting liquid to a nucleic acid detection module for nucleic acid detection, waiting for the result. If a positive result is generated, an emergency response is made in time so that the detected area is under emergency control.

The auxiliary control system includes an automatic control system to control the collecting liquid 600 to flow into the nucleic acid detection module as required. By using the automatic control system, the collection speed of environmental samples is accelerated to some extent so that the time of intermediate links is reduced, thereby improving the nucleic acid detection efficiency.

The aerosol particulate matter collecting device can be applied to the collection of Covid-19, as well as other viruses, bacteria and other substances that can be suspended in the aerosol except Covid-19, which can be treated in various ways after collection.

The collecting liquid can be divided into inactivated collecting liquid and non-inactivated collecting liquid. Inactivated collecting liquid can enable the viruses to be inactivated by cracking, and be used for magnetic bead enrichment. Inactivated collecting liquid includes Guanidine salt and an RNase inhibitor, and is stored at room temperature. Non-inactivated collecting liquid can enable the viruses to be maintained active, and includes gentamicin, fungal antibiotics, BSA(V) (bovine serum albumin), a cryoprotectant, a biological buffer and amino acids and a Hanks solution (an inorganic salt solution and a balanced salt solution), and is stored at low temperature.

According to different purposes, other different collecting liquid can also be made, such as guanidine hydrochloride, urea, guanidine isothiocyanate, dithiothreitol, protease K and the like. The collecting liquid can be selected according to actual needs.

According to the embodiment in the third aspect of the present disclosure, collecting and detecting equipment is provided, including a particulate matter detecting device and the aerosol particulate matter collecting device in the above-mentioned embodiment. The particulate matter detecting device is communicated with the collection unit 400 so as to guide the collecting liquid 600 into the aerosol particulate matter detecting device.

The particulate matter detecting device can be configured as a detecting device for inorganic and organic components in the particulate matter. For example, the particulate matter detecting device can detect nucleic acids, proteins, organic and inorganic small molecules and the like, but it is not limited to these. The particulate matter detecting device can be selected as required. For example, the collecting and detecting equipment is applied to the detection of heavy metals and environmental pollutants in the particulate matter. Or, the collecting and detecting equipment is applied to cultivation of organisms (microorganisms such as bacteria and viruses). The structure of the particulate matter detecting device is not limited here, and any device that detects the collecting liquid 600 may be provided.

Taking the application of the collecting and detecting equipment in nucleic acid detection as an example, the following explanation is made.

The collecting liquid with particulate matter can be directly used for nucleic acid detection or the samples can be input to be cultured with a culture medium for physical and chemical analysis. Possible nucleic acid detection methods and cultures include, but are not limited to, whole gene sequencing technology, polymerase chain reaction (PCR), micro-drop digital polymerase chain reaction (ddPCR), reverse transcription loop-mediated isothermal amplification technology (RT-LAMP) and regularly clustered short palindrome repetition (CRISPR) series technology. Regularly clustered short palindrome repetition (CRISPR) series technology includes SHERLOCK (specific high sensitivity enzymatic reporter unLOCKing) molecular diagnosis platform, DETECTR (DNA endonuclease targeted CRISPR trans reporter, DETECTR) nucleic acid detection method, STOPCovid (SHERLOCK testing in one Pot, STOPCovid), NEAR chip, ethylene glycol dimethyl ether series culture medium and plant hemagglutinin culture medium.

Figure 9:
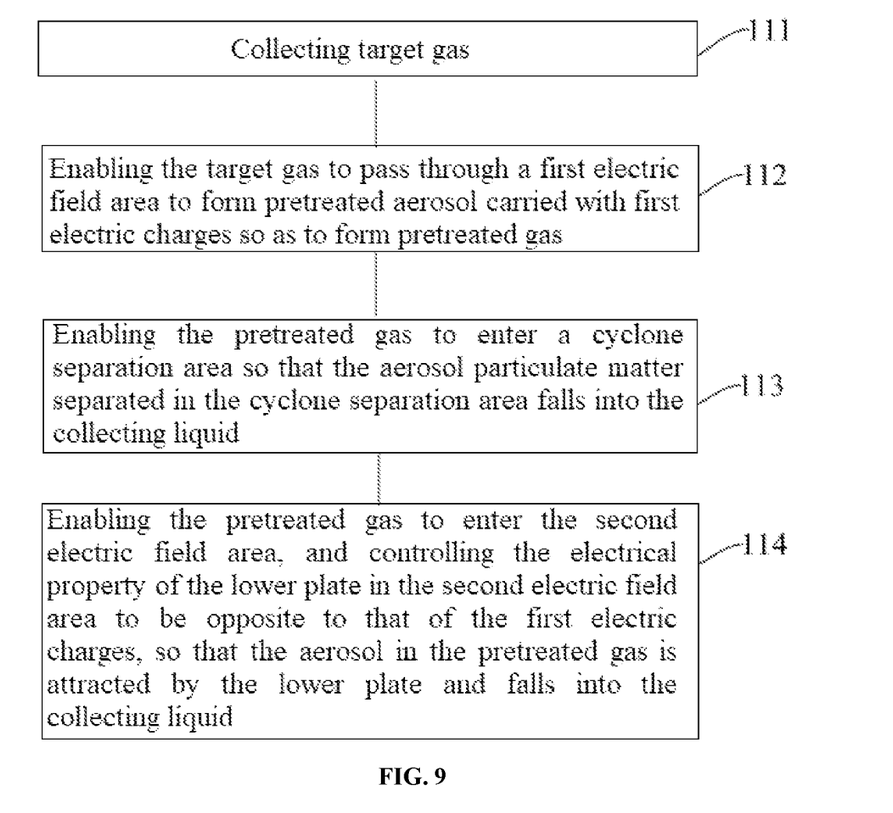
FIG. 9 is a flow diagram of an aerosol particulate matter collecting method provided by the present disclosure.

According to the embodiment in the fourth aspect of the present disclosure, referring to FIG. 9, an aerosol particulate matter collecting method is provided, including the following steps.

Step 111, collecting target aerosol.

Step 112, enabling the target aerosol to pass through the first electric field area to form pretreated aerosol carried with first electric charges so as to form pretreated aerosol.

The first electric charges can be positive electric charges or negative electric charges. The positive electric charges and negative electric charges have own advantages and disadvantages, and can be selected according to the needs.

Step 113, enabling the pretreated aerosol to enter the cyclone separation area so that the aerosol particulate matter separated in the cyclone separation area falls into the collecting liquid.

In the cyclone separation area, the aerosol is pretreated to form a cyclone and the particulate matter in the aerosol is separated.

Step 114, enabling the pretreated aerosol to enter the second electric field area, and controlling the electrical property of the lower plate in the second electric field area to be opposite to that of the first electric charges, so that the particulate matter in the pretreated aerosol is attracted by the lower plate and falls into the collecting liquid.

At that time, the first electric charges are negative, and the lower plate is positive, so that the lower plate can be grounded. The upper plate corresponding to the lower plate can be set as a negative plate.

Under the action of the two electric fields, the particulate matter in the target aerosol can be separated by electrostatic adsorption, so that the aerosol falls into the collecting liquid. The method is simple and has good collection effect.

At least part of the cyclone separation area is overlapped with the second electric field area. That is, step 114 is carried out after step 113, or step 114 and step 113 are carried out simultaneously, which can be selected as required.

When step 114 and step 113 are carried out simultaneously, cyclone separation is combined with electrostatic separation, so that the separation effect of particulate matter in the target aerosol is better through the double effects.

It needs to be noted that the aerosol particulate matter collecting device can be used in the aerosol particulate matter collecting method.

The aerosol particulate matter collecting method can be used for, but not limited to, collecting Covid-19, and can also be used for collecting aerosol of other components.

Certainly, the collection of Covid-19 can also be combined with the retention effect of the rough surface on the particulate matter, that is, by using the above-mentioned collection unit, the protrusions are arranged on the bottom plate of the collection unit to form a rough surface and a curved flow channel through the protrusions.

In some embodiments, the collection unit is arranged at the bottom of the cyclone separation area and the second electric field area. The collection unit is provided with protrusions and a flow channel defined by the protrusions. The flow channel is used for accommodating the collecting liquid. The collection unit is provided with a liquid inlet and a liquid outlet which are communicated with the flow channel. The liquid inlet and the liquid outlet are communicated through a pipeline, and the pipeline is provided with a pump.

The foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. An aerosol particulate matter collecting device, comprising:
    a shell, provided with an air inlet and an air outlet;
    a first electric field component, connected to the shell and forming a first electric field area, and is configured for enabling aerosol passing through the first electric field area to carry first electric charges;
    a second electric field component, connected to the shell and forming a second electric field area, wherein the second electric field area is located downstream of the first electric field area, wherein the second electric field component comprises a first plate and a second plate located above the first plate, and a potential difference is formed between the first plate and the second plate, and an electric property of the first plate is opposite to an electric property of the first electric charges; and
    a collection unit, arranged inside the shell, wherein a bottom plate of the collection unit is located between the first plate and the second plate, and is provided with protrusions, and wherein a flow channel for accommodating collecting liquid is formed in the bottom plate, and the protrusions are configured to enable the flow channel to extend along a curve.

2. The aerosol particulate matter collecting device according to claim 1, wherein the shell is provided with a first channel section, a second channel section and a connecting section for connecting the first channel section and the second channel section, an angle is formed between the first channel section and the second channel section, the collection unit is provided in the connecting section and the second channel section, the connecting section is selectively provided with the second electric field component, and the second channel section is provided with the second electric field component.

3. The aerosol particulate matter collecting device according to claim 2, wherein the connecting section extends along a straight line or a curve; and wherein the connecting section comprises one of:
  a slope gradient of the connecting section extending along the straight line that is greater than or equal to 0.2 and less than or equal to 0.8, and a curvature ratio of the connecting section extending in the curve that is greater than or equal to 2.5 and less than or equal to 6.5.

4. The aerosol particulate matter collecting device according to claim 1, wherein each protrusion comprises a first part and a second part located on the first part, a first surface of the first part extends along a vertical direction, the second part is provided with a second surface connected to the first surface, and the second surface is inclined towards the air outlet relative to the first surface.

5. The aerosol particulate matter collecting device according to claim 4, wherein a longitudinal section of the second part along a wind flow direction is at least one of a triangle, a semicircle and an ellipse.

6. The aerosol particulate matter collecting device according to claim 4, wherein a liquid surface of the collecting liquid in the collection unit is set to be not higher than a connection position where the first part and the second part are connected; and
  a height of the first part is greater than or equal to half of a height of the protrusion.

7. The aerosol particulate matter collecting device according to claim 1, wherein the flow channel is an S-shaped flow channel, a spiral flow channel or a flow channel formed by communicating a plurality of U-shaped flow channels;
  and/or, a width of the flow channel is greater than or equal to a width of each protrusion;
  and/or, the bottom plate is provided with 30-60 protrusions per meter.

8. The aerosol particulate matter collecting device according to claim 1, wherein the collection unit is detachably provided in the shell and provided with a liquid inlet and a liquid outlet which are communicated with the flow channel, and the liquid inlet and the liquid outlet are communicated through a pipeline, and the pipeline is provided with a pump.

9. The aerosol particulate matter collecting device according to claim 1, wherein the first plate is parallel to the second plate, the first plate is grounded, and the second plate is loaded with a voltage greater than or equal to 1 kV and less than or equal to 60 kV;
  and/or, the first electric field component comprises a corona needle and a third plate surrounding a circumference of the corona needle, and the first electric field component is loaded with a voltage greater than or equal to 1 kV and less than or equal to 30 kV.

10. The aerosol particulate matter collecting device according to claim 1, wherein a filter is arranged at the air inlet; and/or, a baffle is arranged at the air outlet, and a baffle area of the baffle is adjustable.

11. Collecting and detecting equipment, comprising a particulate matter detector and an aerosol particulate matter collecting device,
  wherein the aerosol particulate matter collecting device comprises:
  a shell, provided with an air inlet and an air outlet;
  a first electric field component, connected to the shell and forming a first electric field area, and is configured for enabling aerosol passing through the first electric field area to carry first electric charges;
  a second electric field component, connected to the shell and forming a second electric field area, wherein the second electric field area is located downstream of the first electric field area, wherein the second electric field component comprises a first plate and a second plate located above the first plate, and a potential difference is formed between the first plate and the second plate, and an electric property of the first plate is opposite to an electric property of the first electric charges; and
  a collection unit, arranged inside the shell, wherein a bottom plate of the collection unit is located between the first plate and the second plate, and is provided with protrusions, and wherein a flow channel for accommodating collecting liquid is formed in the bottom plate, and the protrusions are configured to enable the flow channel to extend along a curve;
  wherein the particulate matter detector is communicated with the collection unit so as to guide the collecting liquid into the particulate matter detector.

12. The collecting and detecting equipment according to claim 11, wherein the shell is provided with a first channel section, a second channel section and a connecting section for connecting the first channel section and the second channel section, an angle is formed between the first channel section and the second channel section, the collection unit is provided in the connecting section and the second channel section, the connecting section is selectively provided with the second electric field component, and the second channel section is provided with the second electric field component.

13. The collecting and detecting equipment according to claim 12, wherein the connecting section extends along a straight line or a curve; and wherein the connecting section comprises one of:
  a slope gradient of the connecting section extending along the straight line that is greater than or equal to 0.2 and less than or equal to 0.8, and a curvature ratio of the connecting section extending in the curve that is greater than or equal to 2.5 and less than or equal to 6.5.

14. The collecting and detecting equipment according to claim 11, wherein each protrusion comprises a first part and a second part located on the first part, a first surface of the first part extends along a vertical direction, the second part is provided with a second surface connected to the first surface, and the second surface is inclined towards the air outlet relative to the first surface.

15. The collecting and detecting equipment according to claim 14, wherein a longitudinal section of the second part along a wind flow direction is at least one of a triangle, a semicircle and an ellipse.

16. The collecting and detecting equipment according to claim 14, wherein a liquid surface of the collecting liquid in the collection unit is set to be not higher than a connection position where the first part and the second part are connected; and
  a height of the first part is greater than or equal to half of a height of the protrusion.

17. The collecting and detecting equipment according to claim 11, wherein the flow channel is an S-shaped flow channel, a spiral flow channel or a flow channel formed by communicating a plurality of U-shaped flow channels;
  and/or, a width of the flow channel is greater than or equal to a width of each protrusion;
  and/or, the bottom plate is provided with 30-60 protrusions per meter.

18. An aerosol particulate matter collecting method, comprising the following steps:
- collecting a target aerosol;
- enabling the target aerosol to pass through a first electric field area to form a pretreated aerosol carrying first electric charges so as to form the pretreated aerosol;
- enabling the pretreated aerosol to enter a cyclone separation area so that aerosol particulate matter separated in the cyclone separation area falls into a collecting liquid;
- enabling the pretreated aerosol to enter a second electric field area, and controlling an electric property of a lower plate in the second electric field area to be opposite to an electric property of the first electric charges, so that additional particulate matter in the pretreated aerosol is attracted by the lower plate and falls into the collecting liquid; and
- providing a collection unit at a bottom of the cyclone separation area and the second electric field area, wherein the collection unit is provided with protrusions and a flow channel limited by the protrusions, wherein the flow channel is configured for accommodating the collecting liquid, and the collection unit is provided with a liquid inlet and a liquid outlet which are communicated with the flow channel, the liquid inlet and the liquid outlet are communicated through a pipeline, and the pipeline is provided with a pump.

19. The aerosol particulate matter collecting method according to claim 18, wherein at least part of the cyclone separation area is overlapped with the second electric field area.

* * * * *